(12) United States Patent
Levien et al.

(10) Patent No.: US 10,533,678 B2
(45) Date of Patent: Jan. 14, 2020

(54) ELECTROMAGNETIC VALVE

(71) Applicant: Andreas Stihl AG & Co. KG, Waiblingen (DE)

(72) Inventors: Patrick Levien, Ebersbach a. d. Fils (DE); Felix Mayer, Waiblingen (DE); Georg Maier, Kernen i. R. (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/854,556

(22) Filed: Dec. 26, 2017

(65) Prior Publication Data
US 2018/0180195 A1    Jun. 28, 2018

(30) Foreign Application Priority Data
Dec. 23, 2016   (DE) .......................... 10 2016 015 520

(51) Int. Cl.
*F16K 31/06* (2006.01)
*F16K 1/36* (2006.01)
*F16K 25/04* (2006.01)
*F16K 27/02* (2006.01)

(52) U.S. Cl.
CPC ............ *F16K 31/0658* (2013.01); *F16K 1/36* (2013.01); *F16K 25/04* (2013.01); *F16K 27/029* (2013.01); *F16K 31/0655* (2013.01); *F16K 31/0696* (2013.01)

(58) Field of Classification Search
CPC ............. F16K 31/0658; F16K 31/0696; F16K 31/0655; F16K 25/04; F16K 1/36; F16K 27/029

USPC .................................................... 251/129.16
See application file for complete search history.

(56) References Cited

U.S. PATENT DOCUMENTS

| | | | |
|---|---|---|---|
| 4,848,727 A | 7/1989 | Nanbu et al. | |
| 2004/0144940 A1 | 7/2004 | Seol et al. | |
| 2007/0063160 A1* | 3/2007 | Suzuki | F16K 31/0655 251/129.21 |
| 2010/0243935 A1* | 9/2010 | Mullally | F16K 31/0651 251/129.16 |
| 2012/0228533 A1 | 9/2012 | Ams et al. | |
| 2013/0112904 A1* | 5/2013 | Tanari | F16K 31/0655 251/129.15 |

FOREIGN PATENT DOCUMENTS

DE        102008017764 A1    10/2009

* cited by examiner

*Primary Examiner* — Ian G Paquette
(74) *Attorney, Agent, or Firm* — Walter Ottesen, P.A.

(57) ABSTRACT

An electromagnetic valve has a valve chamber which has an inflow opening for supplying a liquid and an outlet for discharging the liquid. The valve includes a valve seat and a valve member that is assigned to the valve seat. The fluidic connection between the inflow opening and the outlet of the valve is interrupted when a valve seat is closed by the valve member. The valve member is held on an armature plate which is moved by an electromagnetic drive unit toward an end stop which is formed by a first stop surface. In order for the operative capability of the valve to be guaranteed in the case of wear on the end stop, the armature plate is assigned a second stop surface which upon a predefined wear on the first stop surface forms a downstream end stop.

10 Claims, 7 Drawing Sheets

ELECTROMAGNETIC VALVE

CROSS REFERENCE TO RELATED APPLICATION

This application claims priority of German patent application no. 10 2016 015 520.5, filed Dec. 23, 2016, the entire content of which is incorporated herein by reference.

FIELD OF THE INVENTION

The invention relates to an electromagnetic valve having a valve chamber which has at least one inflow opening for supplying a liquid, and at least one outlet for discharging the liquid. The valve has a valve chamber, a valve seat, and a valve member that is assigned to the valve seat, wherein the fluidic connection between the inflow opening and the outlet of the valve is interrupted in the case of a valve seat being closed by the valve member. The valve member is held on an armature plate which by an electromagnetic drive is to be moved toward an end stop which is formed by a first stop surface.

BACKGROUND OF THE INVENTION

A valve of this type is known from DE 10 2008 017 764 A1. The force acting on the armature plate is dependent on an air gap between the magnetic yoke and the armature plate. The air gap can become smaller if there is wear on the end stop of the armature plate. On account thereof, magnetic adhesion and thus malfunctions including a failure of the electromagnetic valve can arise.

SUMMARY OF THE INVENTION

The invention is based on the object of refining an electromagnetic valve of the generic type in such a manner that a reliable functionality of the valve is guaranteed over a long operating life.

The electromagnetic valve of the invention includes: a valve chamber having an inflow opening for supplying a liquid and an outlet for discharging the liquid; a valve assembly including a valve seat and a valve member moveable between a first position wherein the valve member closes the valve seat to interrupt a flow connection between the inflow opening and the outlet and a second position wherein the valve seat is open to reestablish the flow connection; a first end stop defining a first stop surface; an armature plate assembly including an armature plate and the valve member mounted thereon; an electromagnetic drive unit for acting on the armature plate assembly for moving the armature plate assembly so as to bring the valve member into the second position whereat the armature plate comes against the first stop surface; and, a second end stop subordinate to the first end stop and defining a second stop surface for receiving the armature plate assembly thereagainst after predetermined wear occurs at the first stop surface.

The armature plate is assigned a second stop surface which upon wear on the first stop surface forms a downstream end stop. It is provided herein for the downstream end stop to be configured such that a magnetic air gap remains when the armature plate bears on the downstream end stop. Any "magnetic adhesion" of the armature plate to the magnetic yoke of the electromagnetic drive unit is thus avoided. The service life of the electromagnetic valve is increased. The second end stop as compared to an end stop that is embodied in a reinforced manner, for example, has the advantage that a valve having a first end stop and a second end stop can be more finely adjusted.

Moreover, the downstream end stop can reduce the wear on the first end stop by mineral particles. Mineral particles, for example on account of contaminants of fuel in a fuel system, can make their way right up to an electromagnetic valve.

The mineral particles lead to wear on the first stop which is composed of the stop pairing of metal/metal. Moreover, particles can embed themselves in the second elastic stop. When the second elastic element is compressed, this second elastic element increasingly diverts the force away from the first stop as the wear on the latter increases. An additional restoring force is thus generated by the compression of the Viton® stop, the restoring force keeping the cumulative closing times almost constant.

Mineral particles of this type can embed themselves in the second elastic stop element. The elastic stop element of the downstream end stop stops the moving armature plate. The armature plate is advantageously stopped in a damped manner. The elastic material of the stop element can generate an additional restoring force. The elastic material is advantageously Viton® which counteracts magnetic adhesion. The elastic stop element, preferably a Viton® element, is resistant to operating fluid such as fuel or a fuel/air mixture and does not lead to the elastic stop element sticking or adhering to the end stop. Alternatively, a plastic disk or a plastic coating can also be provided.

It is to be pointed out that the first stop is always effective before the second downstream stop, on account of which an optimal operation of the electromagnetic valve is guaranteed.

The first stop surface of the first end stop is advantageously assigned a first stop element on the armature plate. The second stop surface of the magnetic yoke or of the electromechanical drive element, respectively, is assigned a second stop element which is advantageously likewise configured on the armature plate. The second stop surface and the second stop element form the downstream end stop. The second stop element in the embodiment is supported by the armature plate.

The first stop element and the assigned first stop surface advantageously form a planar end stop. This planar end stop is advantageously configured as a metallic end stop which in particular is magnetically conducting. The first stop surface herein can expediently be configured as an annular surface. The entire stop surface thus has a circular or annular surface, respectively.

The second stop element of the armature plate is in particular an elastic stop element on the armature plate.

The second stop, or the second stop surface, respectively, advantageously engages after an initial wear on the first stop, or on the first stop surface, respectively. The configuration is provided such that an additional restoring force is provided by the second stop element. As soon as the second stop is effective, the wear on the first stop is decelerated or is in particular completely stopped as soon as the second stop element engages.

The second stop element is advantageously supported by the armature plate. The second stop element of the downstream end stop, and the valve member of the electromagnetic valve are advantageously configured in an integral manner. The valve member herein is expediently made from an elastic material, in particular from Viton®. The valve member herein is simultaneously utilized as a seal; the seal interrupts the flow of fuel between the inflow opening and the outlet.

The elastic valve member advantageously penetrates the armature plate. A first end of the valve member herein advantageously faces the valve seat, and a second end of the valve member faces the magnetic yoke and forms the second stop element.

The first stop element and the first stop surface, while forming an air gap in relation to the core of the magnetic yoke, are part of the magnetic circuit of the electromagnetic drive unit. The magnetic circuit is closed while maintaining an air gap when the first stop element of the armature plate bears on the first stop surface of the electromagnetic drive unit. This is guaranteed by the second stop. The fluidic connection between the inflow opening and the outlet of the valve is open in the case of a closed magnetic circuit of the electromagnetic drive unit; the valve is open. The valve is advantageously a closed valve when not energized. Alternatively, the valve can also be an open valve when not energized. An open valve when not energized means that the inflow opening to the outlet of the valve is open in the case of a non-closed magnetic circuit and a flow of liquid through the valve, for example fuel, is thus possible.

The armature plate having the valve member in the case of the embodiment is to be moved counter to the force of a reset spring. Upon wear on the first stop surface, the elastic stop element of the advantageously downstream end stop supports the reset spring in releasing the armature plate from the magnetic yoke.

The second stop element of the downstream end stop is incorporated in a form-fitting manner between an upper side of the armature plate and a lower side of the armature plate. The elastic element is expediently injected into the armature plate.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
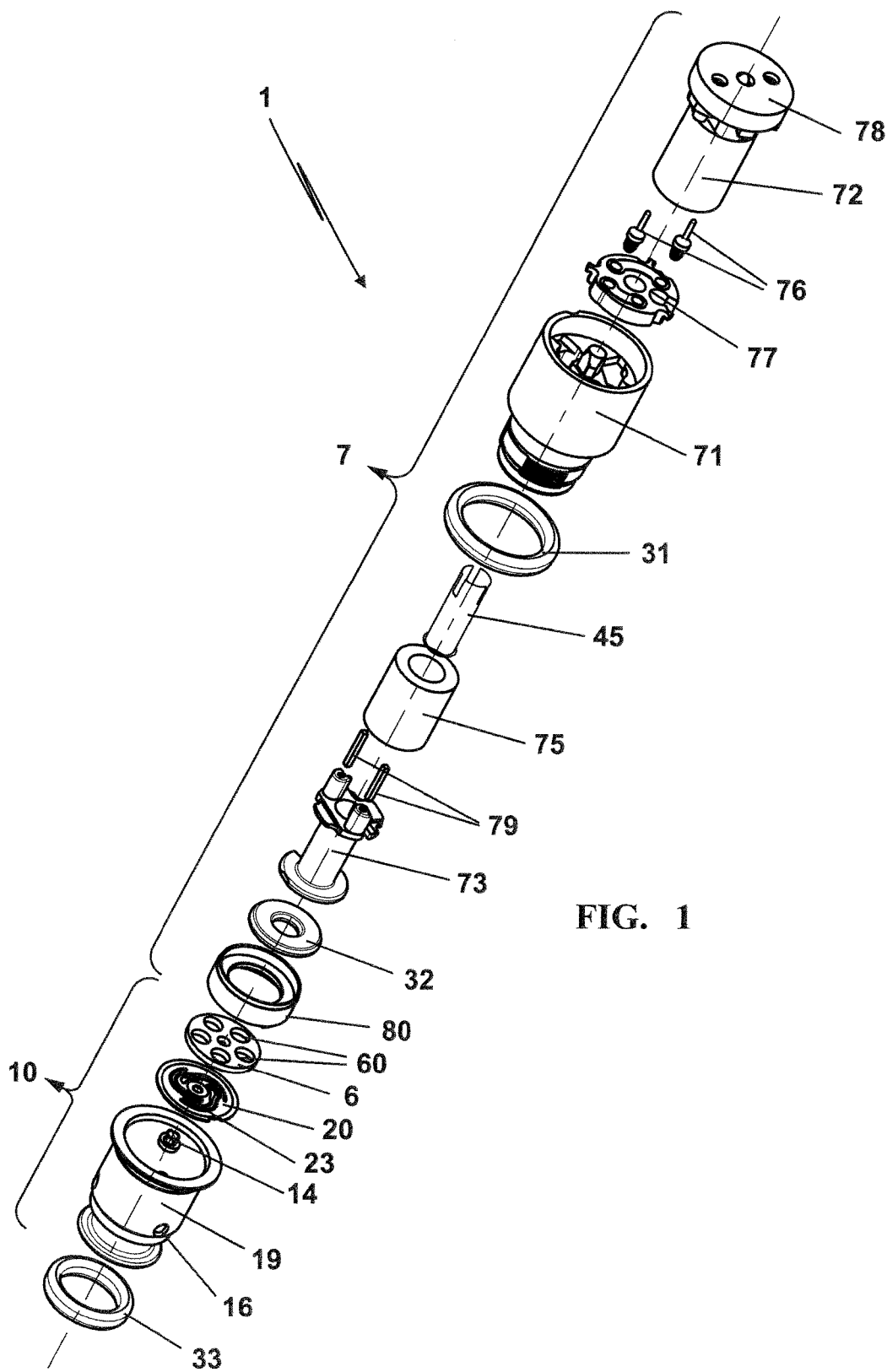
FIG. 1 shows the individual components of an electromagnetic valve according to the invention in an exploded isometric illustration.

The exploded isometric schematic shown in FIG. 1 shows an electromagnetic valve 1 with the individual components thereof. The electromagnetic valve 1 herein can be subdivided into an electromagnetic drive unit 7 and a valve unit 10.

The electromagnetic drive unit 7 is composed substantially of an external housing 71 which is preferably configured so as to be cylindrical. The external housing 71 displays an inner core 72 which together with the external housing forms a magnetic yoke. The external housing 71 and the core are preferably composed of a magnetizable material, in particular of soft iron.

The internal core 72 penetrates a coil carrier 73 which is received in an annular gap 74 of the magnetic yoke. The coil support 73 supports an electrical coil 75, the ends of the latter being connected to electrical connecting terminals 76. The connecting terminals are preferably held in a connecting plate 77, the configuration of the latter being apparent from FIG. 1. The connecting terminals 76 penetrate a housing cover 78 which closes the external housing 71.

That end 70 of the drive unit 7 that faces the valve unit 10 supports a cover ring 80 which is part of the magnetic circuit 8. The cover ring 80 is push fitted onto the end 70 and fixed to the latter. An external annular surface 83 (FIG. 2) is configured on the cover ring 80. The external annular surface 83 has a first stop surface 81 for an armature plate 6. The first stop surface 81 forms a stop for the armature plate 6.

The armature plate 6 has a first stop element 61 which in the embodiment shown forms an annular surface 63. The annular surface 63 is opposite the first stop surface 81 and together with the latter forms a first end stop 4.

A plurality of openings are configured as passthroughs 60 in the armature plate 6. The passthroughs improve the mobility of the armature plate 6 in the valve chamber 11, the armature plate 6 being washed in liquid.

Figure 2:
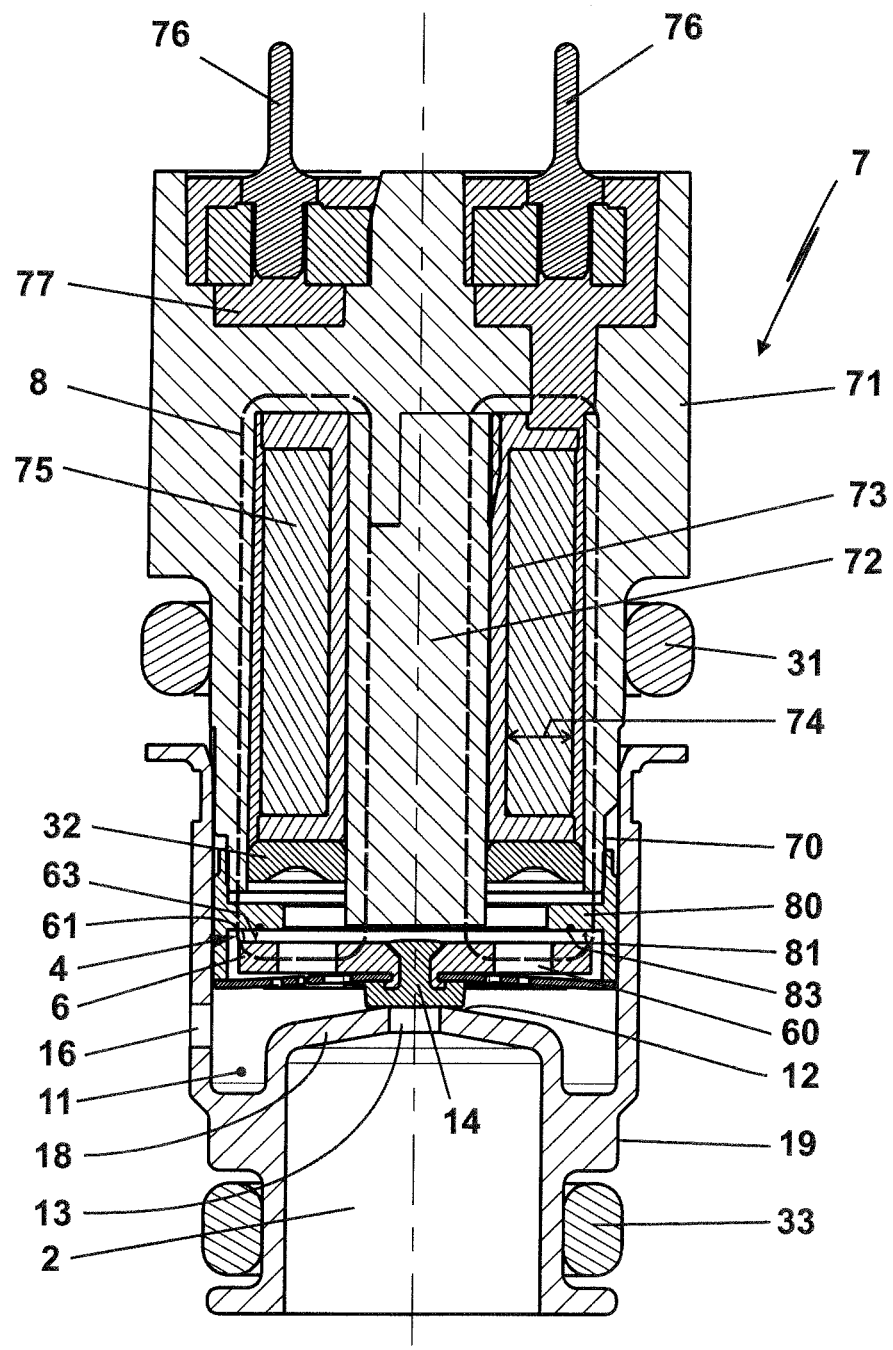
FIG. 2 shows an axial section through an assembled electromagnetic valve.

As is shown in FIGS. 1 and 2, the components of the electromagnetic drive unit 7 thus comprise the external housing 71 having an internal core 72 for forming a magnetic yoke. The electrical coil 75 is held on the coil carrier 73 and by way of electrical contact pins 79 connected to a connecting plate 77 in which two connecting terminals 76 are held. The connecting terminals 76 penetrate the housing cover 78.

The external housing 71 has a stepped external diameter, wherein the housing portion having the smaller external diameter supports a sealing ring 31. The valve unit can be installed in a tight manner in a receptacle housing (not shown in more detail) by way of the sealing ring 31.

The annular gap 74 is advantageously closed by way of a further seal 32 in order for the coil carrier 73 having the electrical coil 75 to be sealed.

The valve unit 10 comprises a valve receptacle 19 having a pot base 18. The pot base has a valve opening 13. The valve opening 13 is advantageously configured in the center of the pot base 18. The valve opening 13 establishes a fluidic connection between an inflow opening 16 of the valve 1 and an outlet 2 of the valve 1.

The pot base 18 of the valve unit 10 on the internal side of the valve chamber 11 is configured so as to be convex, and forms a valve seat 12 for a valve member 14. The valve member 14 is composed in particular from an elastic material, in particular from an elastomeric material, and is held in the armature plate 6. The valve member 14 is advantageously composed of Viton®.

The valve member 14 is incorporated in a central opening 62 in the armature plate 6. The valve member 14 from an elastic material penetrates the armature plate 6. A first end 15 of the valve member 14 advantageously lies so as to face the valve seat 12. A second end 17 of the valve member 14 from an elastic material lies so as to face the core 72 of the magnetic yoke. The second end 17 of the valve member 14 forms an elastic stop element as the downstream end stop 5, as will yet be described hereunder. The armature plate can be insert-molded, in particular insert-molded with Viton®, in order for the elastic stop element to be formed. Alternatively, the elastic stop element can be held on the armature plate 6, for example be adhesively bonded thereon or similar. The elastic valve member 14 need not penetrate the armature plate 6 in the case of such an alternative fastening.

The end 15 of the valve member 14 that faces the valve seat 12 engages beyond the edge of the central opening 62 and can advantageously simultaneously secure a reset spring 20 in the position of the latter on the armature plate 6. The reset spring 20 is isometrically illustrated in FIG. 1 and is composed of an external edge 21 and of a central section 22. As is shown in FIGS. 1 and 3, the central section 22 is interconnected to the external edge 21 by way of spring arms 23 that are disposed in a helical manner.

Figure 3:
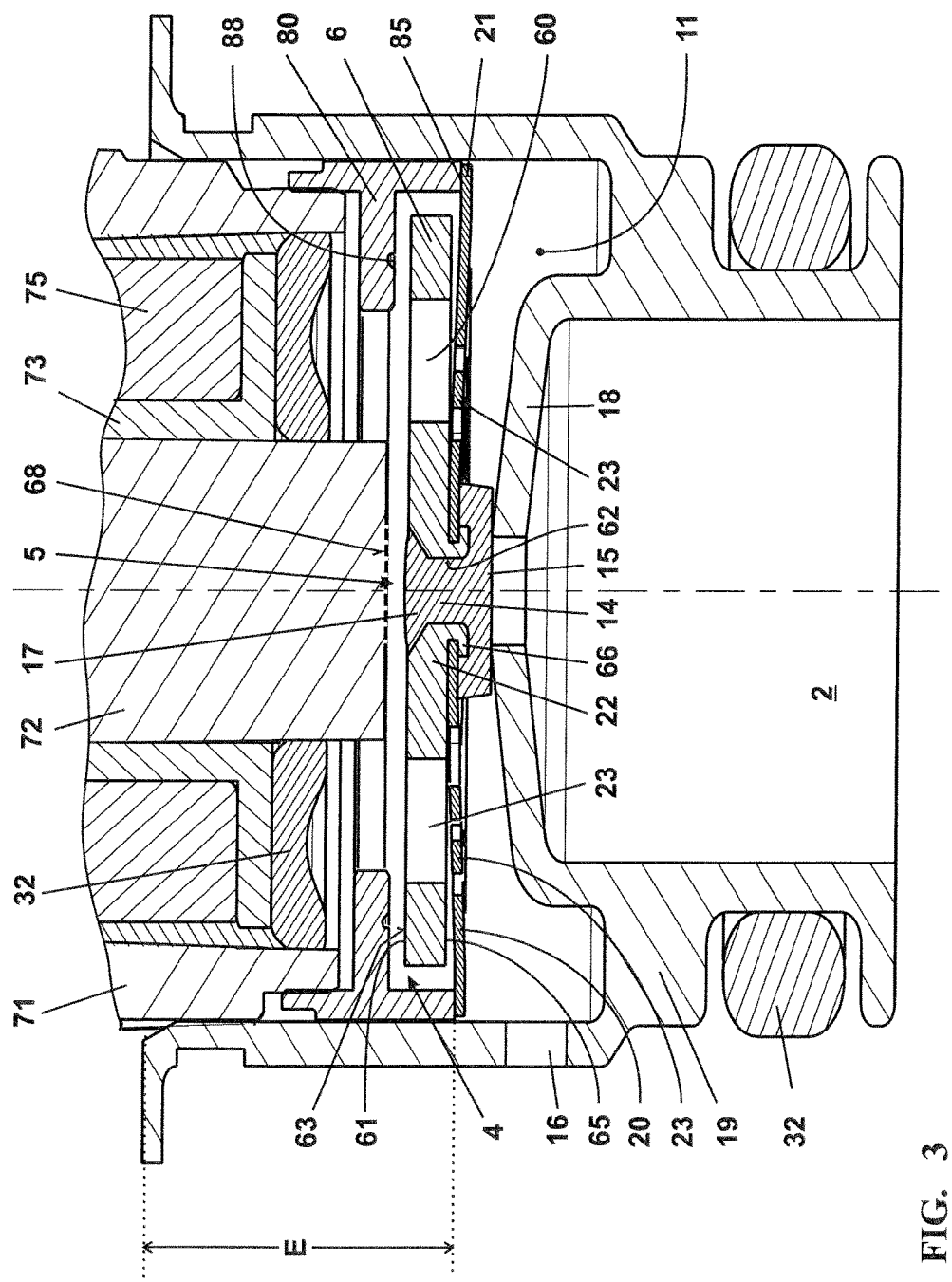
FIG. 3 shows a valve unit of the electromagnetic valve as per FIG. 2 in an enlarged illustration.

As is shown in FIG. 3, a central section 22 of the reset spring 20 is held in a form-fitting manner on the bottom side 65 of the armature plate 6. An opening edge 66 of the central opening 62 is preferably flanged and holds the central section 22 of the reset spring 20 in a form-fitting manner on the armature plate 6.

The external edge 21 of the reset spring 20 bears on a support edge 85 of the cover ring 80, the support edge 85 being formed by an annular shoulder. The end 70 of the drive unit 7 supports the cover ring 80. The reset spring 20 is biased by way of the insertion depth E of the end 70 into the valve receptacle 19. The bias of the reset spring 20 determines the closing force of the valve member 14 on the valve seat 12.

The valve receptacle 19 on the external circumference thereof supports a seal 33.

As can be derived from FIGS. 2 and 3, the valve member 14 under the action of the reset spring 20 by way of a closing force that is provided by the reset spring 20 bears on the valve seat 12 such that the fluidic connection between the inflow opening 16 and the outlet 2 of the valve 1 is interrupted. The valve 1 is closed when the valve member 14 bears on the valve seat 12.

When the electrical coil 75 is energized, the armature plate 6 is raised magnetically in the direction of the arrows 35, whereupon the armature plate 6 comes to lie on the first end stop 4. An air gap 9 remains between the magnetically attracted armature plate 6 and the end side of the core 72 of the magnetic yoke. This air gap 9 serves to avoid magnetic adhesion after the energy has been switched off. Any magnetic adhesion would lead to long closing times. A closed magnetic circuit can be avoided in a targeted manner.

The first stop surface 81 is assigned a first stop element 61 on the armature plate 6. The first stop element 61 of the armature plate 6 and the assigned first stop surface 81 of the electromagnetic drive unit 7 herein form a planar end stop 4. The planar end stop 4 is configured as a metallic end stop. The armature plate 6 as well as the cover ring 80 are both composed of a magnetizable metal, but expediently are not magnetic.

Figure 5:
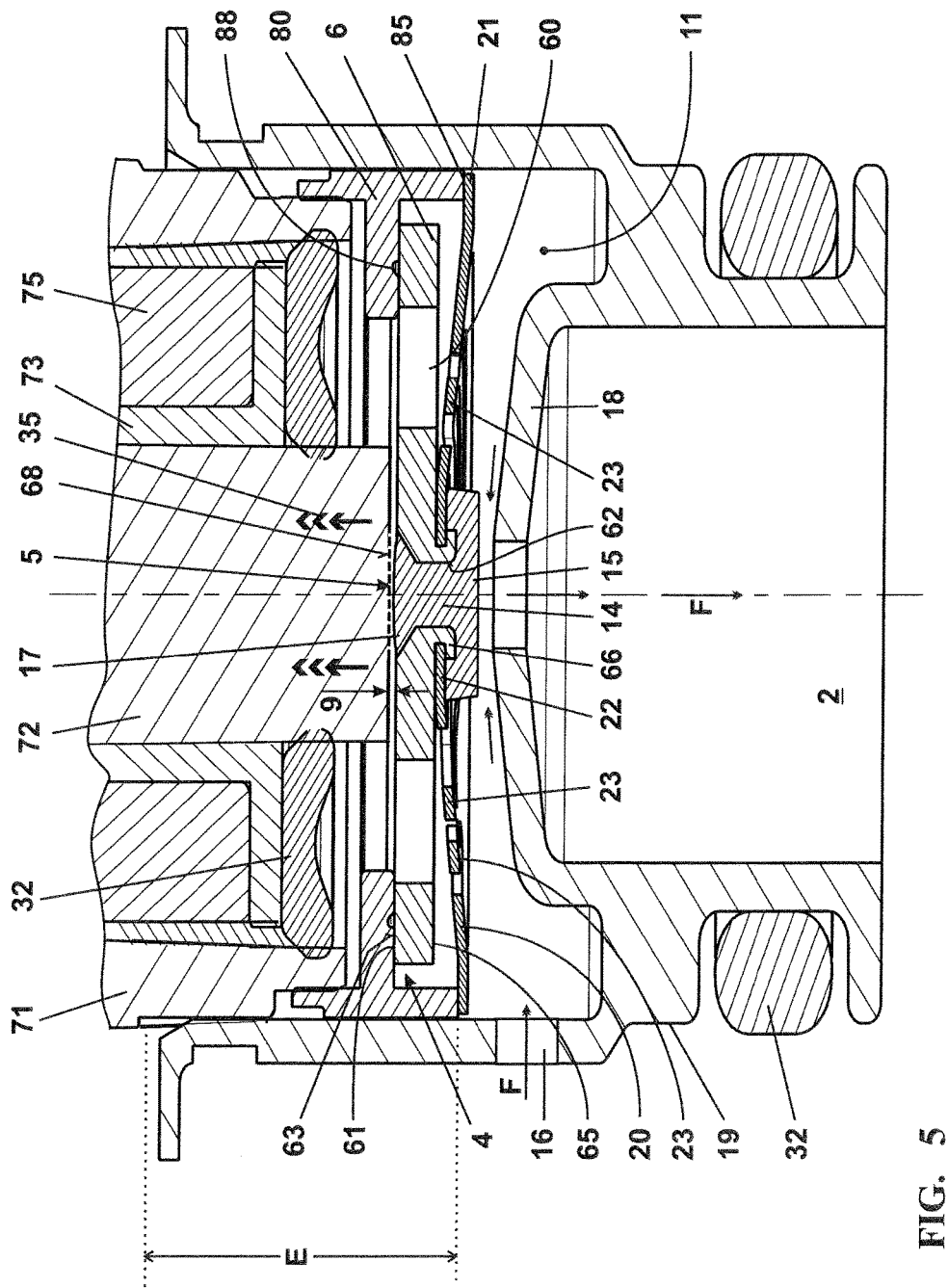
FIG. 5 shows the open valve seat of the electromagnetic valve as per FIG. 4 in an enlarged illustration.
Figure 7:
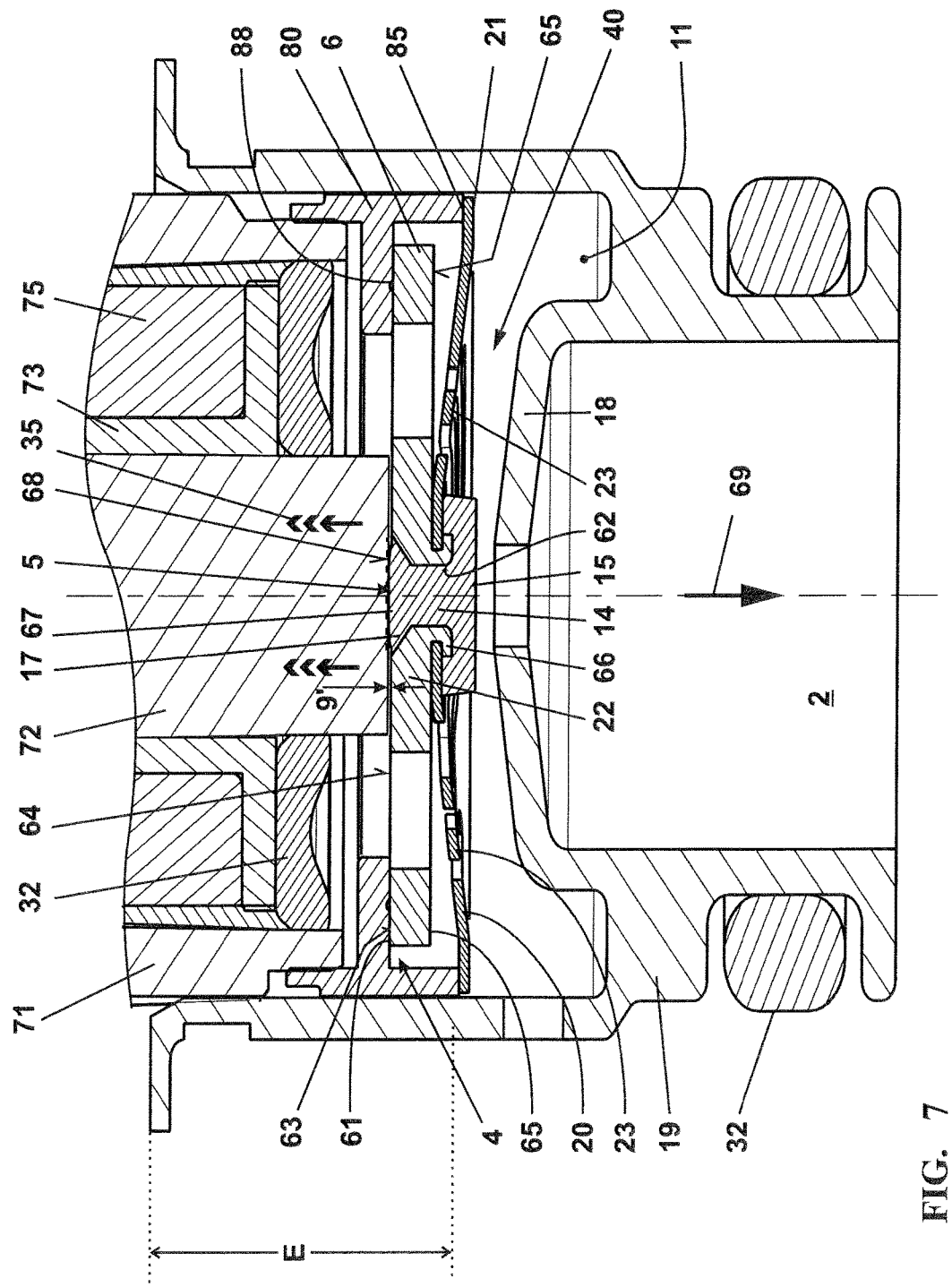

The closing time of the electromagnetic valve 1 depends inter alia on the bearing of the armature plate 6 on the metallic first stop surface 81. In order for the adhesion of the armature plate 6 on the stop surface 81 to be counteracted, a groove 88 is incorporated into the stop surface 81 (FIGS. 3, 5 and 7). The groove 88 is advantageously positioned radially such that the groove 88 lies in the region of the passthroughs 60 in the armature plate 6. Inflow of fuel makes its way into the groove 88 by way of the passthroughs 60 in the armature plate 6. The fuel forces its way through the groove 88 into the gap between the armature plate 6 and the stop surface 81, and cancels the adhesion. Extended closing times can thus be avoided.

Figure 4:
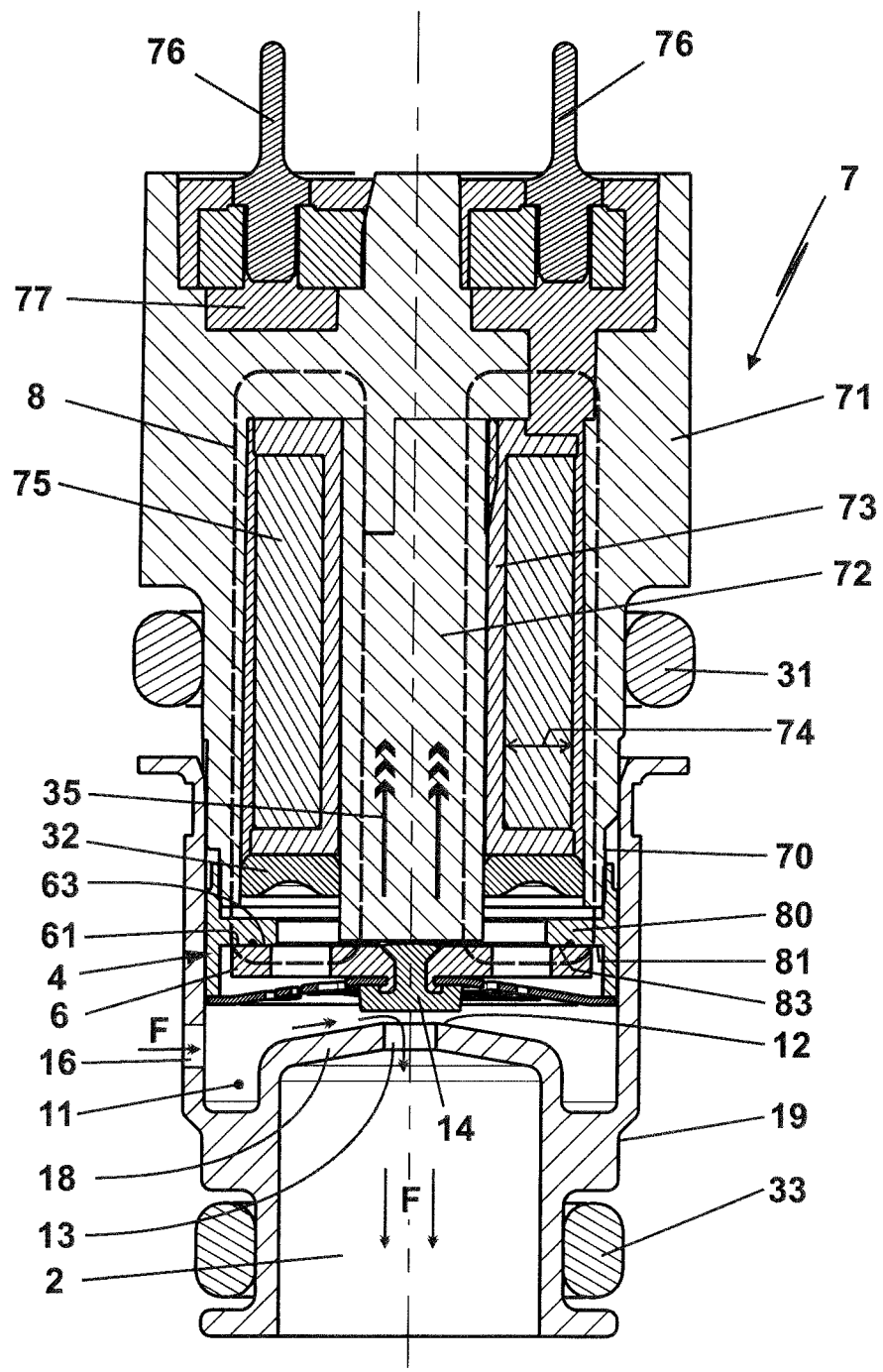
FIG. 4 shows an axial section through an assembled electromagnetic valve according to FIG. 2, with an open valve seat.

The energized electromagnetic valve 1 is illustrated in FIGS. 4 and 5. The electromagnetic drive unit 7 raises the armature plate 6 in the direction of the arrows 35 until the first stop element 61 of the armature plate 6, configured as the annular surface 63, comes to bear on the first stop surface 81 of the electromagnetic drive unit 7. The air gap 9 is maintained herein (FIG. 5).

In the case of an opened valve opening 13, a liquid, preferably fuel, flows in the flow direction in the direction of the arrows F through the inflow opening 16 into the valve chamber 11 and by way of the valve opening 13 to the outflow opening of the outlet 2. This is illustrated in particular in FIGS. 4 and 5.

Figure 6:
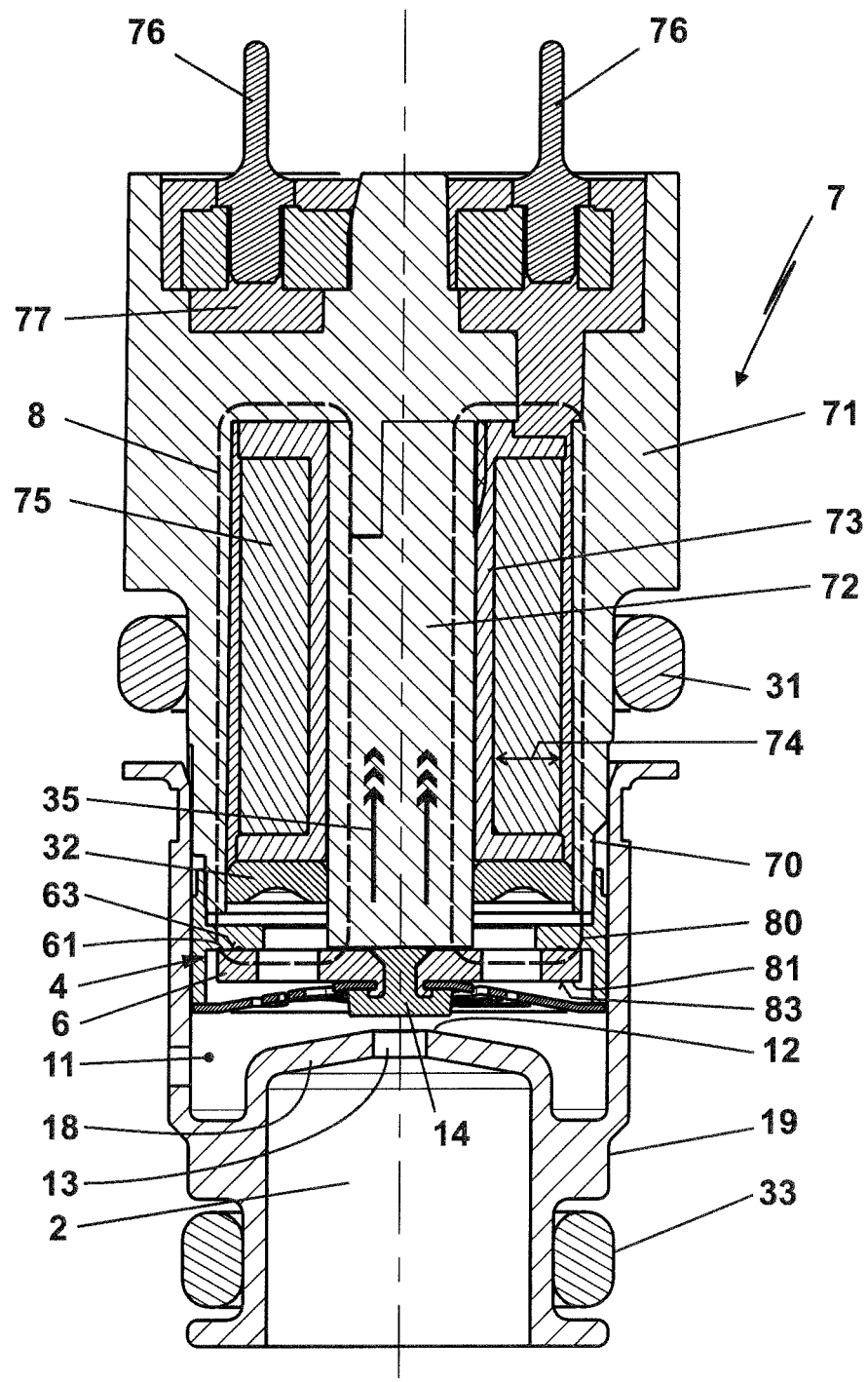
FIG. 6 shows an axial section through an assembled electromagnetic valve according to FIG. 2, with an opened valve seat and an armature plate bearing on a downstream end stop; and, FIG. 7 shows the open valve seat as per FIG. 6 in an enlarged illustration, with the armature plate bearing on a downstream end stop.

The electromagnetic valve 1 is energized in the illustration as per FIGS. 6 and 7; as can be derived from the enlarged illustration according to FIG. 7, the air gap 9 has become smaller by virtue of mechanical wear on the first end stop 4. The air gap 9' is smaller than the air gap 9. The armature plate 6 is assigned a second stop surface 68 which in the movement direction of the armature plate 6 in the direction of the arrows 35 forms a downstream end stop 5. This second stop surface 68 on the electromagnetic drive unit 7 is assigned a second stop element 67. This second stop element 67 is advantageously an elastic stop element which in particular is configured so as to be integral to the valve member 14.

This second, in particular elastic, stop element 67 is held in a form-fitting manner on an upper side 64 of the armature plate and on a bottom side 65 of the armature plate. The valve member is in particular composed of Viton®.

The electromagnetic drive unit 7, by virtue of the deflection of the central section 22 of the reset spring 20, operates counter to a restoring force in the arrow direction 69, the latter corresponding to the closing direction of the valve member 14.

In a preferred embodiment it is provided for the armature plate 6, the reset spring 20, and the valve member 14 to be configured as an assembled functional group 40. The functional group 40 forms a preassembled functional group.

A restoring force, by virtue of the reset spring 20, in the arrow direction 69 acts permanently on the valve member 14. When the electromagnetic drive unit 7 is switched off, the valve 1 closes under the action of the reset spring 20. The valve is preferably a closed valve 1 when not energized.

It is understood that the foregoing description is that of the preferred embodiments of the invention and that various changes and modifications may be made thereto without departing from the spirit and scope of the invention as defined in the appended claims.

What is claimed is:
1. An electromagnetic valve comprising:
 a valve chamber having an inflow opening for supplying a liquid and an outlet for discharging the liquid;
 a valve assembly including a valve seat and a valve member moveable between a first position wherein said valve member closes said valve seat to interrupt a flow connection between said inflow opening and said outlet and a second position wherein said valve seat is open to reestablish said flow connection;
 a first end stop defining a first stop surface;
 an armature plate assembly including an armature plate and said valve member mounted thereon;
 an electromagnetic drive unit for acting on said armature plate assembly for moving said armature plate assem- bly so as to bring said valve member into said second position whereat said armature plate comes against said first stop surface;

a second end stop subordinate to said first end stop and defining a second stop surface for receiving said armature plate assembly thereagainst after predetermined wear occurs at said first stop surface;

said first stop surface being assigned to a first stop element on said armature plate and said second stop surface being assigned to a second stop element on said armature plate;

said first stop element and said first stop surface conjointly defining said first end stop as a surface end stop;

said surface end stop being configured as a metallic end stop; and, said second stop element being an elastic stop element on said armature plate, wherein said second stop surface comes into use after an initial wear of said first stop surface and an additional reset force is made ready by said second stop element.

2. The electromagnetic valve of claim 1, wherein said wear of said first stop surface slows or stops completely as soon as said second stop element comes into use.

3. The electromagnetic valve of claim 1, wherein said electromagnetic valve defines a magnetic circuit; and, said first stop element and said first stop surface are part of said magnetic circuit while forming an air gap.

4. The electromagnetic valve of claim 1, further comprising a reset spring and said armature plate being movable against the force of said reset spring.

5. The electromagnetic valve of claim 1, wherein said armature plate has an upper side and a lower side; and, said second stop element is on said upper side of said armature plate and is held form tight on said lower side of said armature plate.

6. The electromagnetic valve of claim 1, wherein said first stop surface is configured as an annular surface.

7. The electromagnetic valve of claim 6, wherein said second stop element and said valve member are configured as a single element.

8. The electromagnetic valve of claim 1, wherein said valve member is made of an elastic material and extends through said armature plate; and, a first end of said valve member faces toward said valve seat and a second end of said valve member defines said second stop element.

9. The electromagnetic valve of claim 8, wherein said electromagnetic valve defines a magnetic circuit; and wherein said magnetic circuit is closed when said first stop element of said armature plate comes into contact with said first stop surface while forming an air gap.

10. The electromagnetic valve of claim 9, wherein said outlet of said valve assembly is open when said magnetic circuit of said electromagnetic drive unit is closed.

* * * * *